R. ROESLER.
METHOD AND MEANS FOR ASCERTAINING THE CONDITION OF BORE HOLES AND LIKE NARROW CHANNELS.
APPLICATION FILED NOV. 24, 1914.
1,293,202.
Patented Feb. 4, 1919.
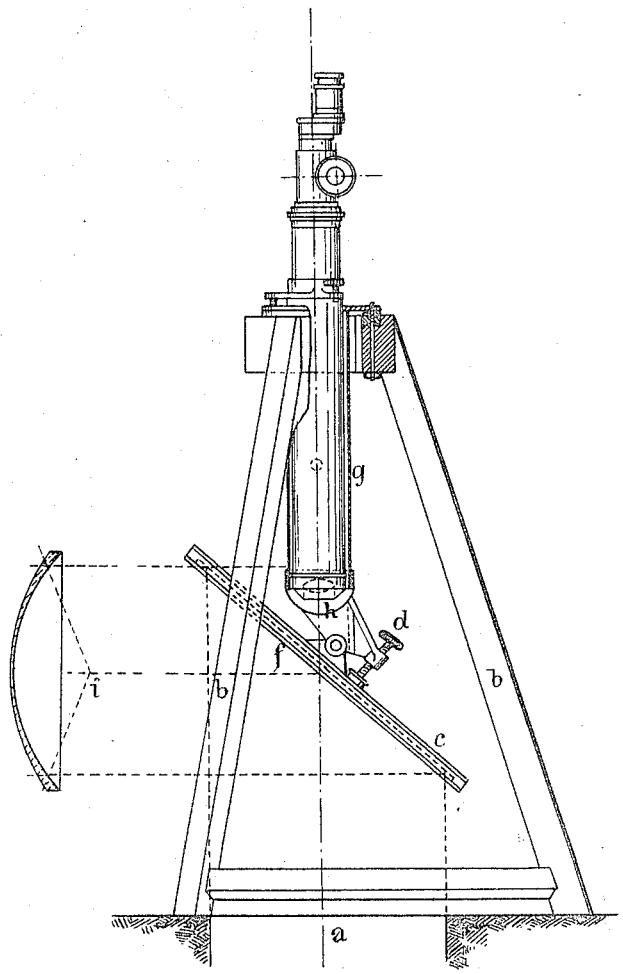

UNITED STATES PATENT OFFICE.

RUDOLF ROESLER, OF BUCHAREST, ROUMANIA.

METHOD AND MEANS FOR ASCERTAINING THE CONDITION OF BORE-HOLES AND LIKE NARROW CHANNELS.

1,293,202.　　　　　　　Specification of Letters Patent.　　　Patented Feb. 4, 1919.

Application filed November 24, 1914.　Serial No. 873,703.

*To all whom it may concern:*

Be it known that I, RUDOLF ROESLER, engineer, a subject of the King of Bavaria and the German Emperor, residing at 10 Strada Lipscani, Bucharest, Kingdom of Roumania, have invented a new and useful Improvement in Methods and Means for Ascertaining the Condition of Bore-Holes and like Narrow Channels; and I do hereby declare the following to be a full, clear, and exact description of the same.

The present invention refers to a method and a means for ascertaining the condition of bore holes and like narrow channels.

In narrow bore holes and bore wells often obstructions occur by invasions of water, breaking the bore-instruments, etc. The measures for overcoming these obstructions depend on the different causes and must be chosen according to them. The election of the measures to be adapted has been hitherto very difficult, because it is impossible to ascertain the cause of the obstruction by a direct ocular inspection. It was necessary to make very expensive and tedious experiments. The same difficulty has heretofore arisen in ascertaining the geological formation of the soil.

The invention consists in introducing a powerful light source by mirroring into the interior of the bore hole and examining the lightened bore hole by means of a telescope.

The purpose of the present invention is to overcome the said difficulty.

The drawing shows a vertical section of an arrangement embodying the invention.

Above bore hole $a$ is the mirror $c$ having a hole suitably arranged in a support $b$. The inclination of the mirror $c$ may be varied by suitable means, for instance screws $d$. The mirror $c$ has an opening $f$ for the telescope $g$ which is suitably arranged in the support $b$, from which it may be removed. The telescope $g$ may, however, be arranged independently from the support of the mirror. The objective $h$ of the telescope $g$ is arranged above the opening $f$ of the mirror $c$. By the said arrangement one is able to inspect by means of the telescope the interior of the bore hole which is lightened by the mirror.

In order to increase the light emitted by the mirror one may use a reflector $i$ or another source of artificial light.

I claim:

1. A means for examining the interior of bore holes and narrow channels, said means comprising a mirror for introducing light from a light source into the interior of the hole or channel, said means having a sight opening therethrough, in combination with a telescope arranged in line with said sight opening, for examining the lightened hole.

2. A means for examining the interior of bore holes and narrow channels, said means comprising a mirror for introducing light from a light source into the interior of the hole or channel, said mirror having a sight opening therethrough, in combination with a telescope disposed at an angle above the mirror and arranged in line with said sight opening for examining the lightened hole.

3. A means for examining the interior of bore holes and narrow channels, said means comprising a frame, a mirror and a telescope both carried by the frame, the mirror having a sight opening therethrough and the telescope arranged so as to be in line with said opening.

4. A means for examining the interior of bore holes and narrow channels, said means comprising a frame, a telescope carried by the frame and a mirror adjacent the telescope and adjustable relatively to the latter, the mirror having a sight opening therethrough in line with the telescope.

5. A means for examining the interior of bore holes and narrow channels, said means comprising a support, a telescope carried thereby and a mirror adjustable relatively to the telescope.

In testimony whereof, I have signed my name to this specification in the presence of two subscribing witnesses.

RUDOLF ROESLER.

Witnesses:
　PAUL SOLOMON,
　LEONARD JACQUES TALLE.